United States Patent Office 3,609,831
Patented Oct. 5, 1971

3,609,831
METHOD OF MANUFACTURING A GAUZE ELECTRODE FOR USE IN A VIDICON CAMERA TUBE AND CAMERA
Johannes van Esdonk, Godefridus Henricus Broers, and Albertus Versteyne, Emmasingel, Eindhoven, Netherlands, assignors to U.S. Philips Corporation, New York, N.Y.
Filed May 14, 1969, Ser. No. 824,479
Claims priority, application Netherlands, May 18, 1968, 6807091
Int. Cl. H01j 9/18, 9/36
U.S. Cl. 29—25.15                       6 Claims

ABSTRACT OF THE DISCLOSURE

A gauze electrode for a vidicon ("Plumbicon") having a diameter of 15 mm. or smaller. A maximum light transmission of the gauze electrode is obtained by first etching copper gauze which is manufactured by electrodeposition to a light transmission of 70% and then securing it by diffusion at approximately ⅔ of the melting temperature of the material of the gauze between two copper-nickel rings. The width of the rings is smaller than 15% of their original outside dimension.

---

Figure 1:
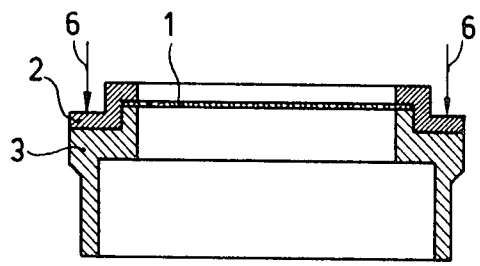

The invention relates to a method of manufacturing a gauze electrode suitable for use in a vidicon camera tube, in which a gauze which is manufactured by electrodeposition and preferably consists of copper the light transmission of which is more than 50%, is counted between two metal frames.

The invention relates in particular to a method of manufacturing such a gauze electrode for a vidicon tube which has an outside diameter of less than 20 mm.

The invention furthermore relates to a vidicon camera tube provided with such a gauze electrode.

In order to make camera tubes as small and light as possible, it is endeavoured to minimize the dimensions, particularly the diameter of the camera tubes, while maintaining certain requirements for the definition of the picture. It is found that the reduction of a camera tube, which can be achieved considerably depends upon the fineness and light transmission of the gauze electrode placed immediately in front of the picture screen electrode.

In the U.S. patent specification 2,805,986, column 1, lines 43–44 it is already stated that the light transmission of such a gauze can be increased to 60% by etching. This patent specification furthermore describes a method of manufacturing such a fine gauze electrochemically or by electrodeposition.

In addition, U.S. patent specification 2,654,940 describes a method of mounting such a fine gauze between two metal frames by means of welding in an inert atmosphere. Since the gauze may be wrinkled and pleated the screen after welding is heated to above 800° C. (100° C.) below the melting temperature of the material of the gauze) so that increase of the density of the material of the gauze and hence shrinkage occurs so that the gauze is tightened. Gauze which has been etched to a light transmission of more than 50%, however, is not suitable for this method because it tears upon shrinkage.

For the welding operation it is furthermore necessary to give the rims of the frames a sufficient width so that they do not burn away during welding and the gauze can be rigidly clamped between them. Welding must moveover be carried out on the outer edge of the frame since deformation of the inner edge of the frames has a large influence on the quality of the picture. It is found in practice that the frames must therefore have rims, the width of which is at least 2 mm. When the outer diameter of the frames is, for example, 13.5 mm. the frames reduce the light transmission of the gauze electrode considerably.

A considerably larger light transmission of such an electrode consisting of a gauze which is manufactured by electrodeposition and has been etched so that the light transmission is more than 50% can be obtained if, according to the invention, the gauze is mounted by means of diffusion at a temperature which is approximately ⅔ of the melting temperature of the material of the gauze in a reducing atmosphere between two metal frames, the width of the rim of which is smaller than 15% of the corresponding outer dimension of the frame.

By performing the diffusion at a comparatively low temperature it is avoided that such a strong density of the material of the etched gauze occurs, that it shrinks too strongly and tears. During diffusion, no pleats are formed in the gauze so that a small shrinkage is already sufficient to tighten the gauze. Moreover, the inner edges of the frame remains entirely sound. In order to promote diffusion at low temperatures, the frames may be copper-plated.

Figure 2:
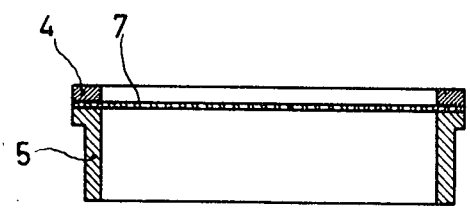

The invention will now be described in greater detail with reference to the accompanying drawing, in which FIG. 1 is a cross-sectional view of a gauze electrode used so far by applicants and FIG. 2 is a corresponding cross-sectional view of a gauze electrode manufactured by means of the method according to the invention.

Referring now to FIG. 1, reference numeral 1 denotes a copper gauze which is manufactured by electrodeposition, is not etched and has approximately 700 meshes per cm. and a light transmission of 45%. The gauze is clamped between two annular frames 2 and 3 consisting of a copper-nickel alloy which are welded together by means of spot welds or by an annular weld on the surfaces denoted by arrows 6 so as to minimize the deformation of the inner edge of the frame 2, 3. The width of the frame board is 2 mm., the outside diameter 13.5 mm. so that the aperture of the gauze electrode has a diameter of 9.5 mm. After welding, the electrode is heated in an inert atmosphere at approximately 800° C. so that the gauze tightens.

In FIG. 2 the copper gauze 7 is etched to a light transmission of 70% and secured to the rings 4 and 5 by means of diffusion. Diffusion is obtained by heating at approximately ⅔ of the melting temperature of copper, namely at 650° C., for 12 minutes, the rings 4 and 5 being forced on each other with a pressure of 300 gms. In this case, like in FIG. 1, the rings consist of a copper-nickel alloy (55% by weight Cu, 45% by weight Ni) and, if desired, may be copper-plated in addition so as to promote the diffusion process.

The width of the rim of the rings 4, 5 is 0.75 mm. so that the aperture of the electrode of FIG. 2 has a diameter of 12 mm. Due to the comparatively low heating temperature the etched gauze tightens without tearing or deforming the rings.

In FIG. 1, the width of the rim board is approximately 15% of the outside diameter of the rim, in FIG. 2 only 5.6%. It has been found that rims having a width of 0.5 mm. may also be used. The aperture of the electrode shown in FIG. 2 is approximately 60% larger than that shown in FIG. 1. The electrode described is destined for a vidicon camera tube having an outside diameter of 15 mm., but similar electrodes can be manufactured without great objections for smaller camera tubes also.

By using the invention a better definition of the picture can be obtained with a given diameter of a camera tube, or with a given definition a tube having a smaller diameter can be used as a result of which the camera becomes considerably smaller and lighter, particularly for colour television pictures, than in the known constructions.

Although a circular gauze electrode has been described, the invention may alternatively be applied to gauze electrodes shaped differently, for example, rectangular or square gauze electrodes.

What is claimed is:

1. A method of manufacturing a gauze electrode suitable for use in a vidicon camera tube, comprising the steps of mounting a gauze consisting of copper which is manufactured by electrode-position and has been etched to a light transmission of more than 50% between two metal frames having a width smaller than 15% of the corresponding outer diameter of the frame, and applying pressure and heating the gauze at a temperature which is not exceeding ⅔ of the melting temperature of the material of the gauze in a reducing atmosphere to secure the gauze between the metal frames by diffusion.

2. A method of manufacturing gauze electrode as claimed in claim 1, wherein the width of the frame is smaller than 10% of the corresponding outside dimension of the frame.

3. A method of manufacturing gauze electrode as claimed in claim 2, wherein the gauze consists of copper, has approximately 700 meshes per cm. and a light transmission of 70% and the frame consists of a copper-nickel alloy.

4. A method of manufacturing gauze electrode as claimed in claim 3, wherein the frames are copper-plated.

5. A method of manufacturing gauze electrode as claimed in claim 2 wherein the width of the frame is smaller than 1 mm.

6. A method of manufacturing gauze electrode as claimed in claim 2 wherein the inner edges of the frames are undeformed.

References Cited

UNITED STATES PATENTS

| | | | |
|---|---|---|---|
| 2,654,940 | 10/1953 | Law | 29—445 X |
| 2,790,228 | 4/1957 | Koda et al. | 29—25.17 |
| 2,805,986 | 9/1957 | Law | 29—51 X |
| 2,926,419 | 3/1960 | Harris | 29—25.17 |
| 3,022,440 | 2/1962 | Saileau Jr. | 29—25.18 X |
| 3,238,410 | 3/1966 | Beggs | 29—25.17 X |
| 3,458,913 | 8/1969 | Schmidt et al. | 29—25.17 |

JOHN F. CAMPBELL, Primary Examiner

R. B. LAZARUS, Assistant Examiner